United States Patent
Francini et al.

(10) Patent No.: US 11,003,963 B2
(45) Date of Patent: May 11, 2021

(54) METHOD AND SYSTEM FOR IDENTIFYING TARGETS IN SCENES SHOT BY A CAMERA

(71) Applicant: Telecom Italia S.p.A., Milan (IT)

(72) Inventors: Gianluca Francini, Turin (IT); Fabrizio Moggio, Turin (IT); Nicola Reale, Turin (IT); Andrea Varesio, Turin (IT); Marco Vecchietti, Turin (IT)

(73) Assignee: Telecom Italia S.p.A., Milan (IT)

(*) Notice: Subject to any disclaimer, the term of this patent is extended or adjusted under 35 U.S.C. 154(b) by 109 days.

(21) Appl. No.: 16/474,281

(22) PCT Filed: Dec. 27, 2016

(86) PCT No.: PCT/EP2016/082710
§ 371 (c)(1),
(2) Date: Jun. 27, 2019

(87) PCT Pub. No.: WO2018/121841
PCT Pub. Date: Jul. 5, 2018

(65) Prior Publication Data
US 2019/0347530 A1    Nov. 14, 2019

(51) Int. Cl.
*G06T 7/11*    (2017.01)
*G06K 9/68*    (2006.01)
*G06T 7/70*    (2017.01)
*G06K 9/00*    (2006.01)

(52) U.S. Cl.
CPC ........ *G06K 9/6857* (2013.01); *G06K 9/00711* (2013.01); *G06T 7/11* (2017.01); *G06T 7/70* (2017.01); *G06K 2209/21* (2013.01); *G06T 2207/10016* (2013.01)

(58) Field of Classification Search
CPC .. G06K 9/00711; G06K 9/00744; G06K 9/46; G06K 9/4609; G06K 9/4642; G06K 9/4671; G06K 9/6201; G06K 9/202; G06K 9/6203; G06K 2009/6213; G06K 9/6857; G06K 2209/21; G06T 7/11; G06T 7/174; G06T 7/70; G06T 7/73; G06T 7/74
See application file for complete search history.

(56) References Cited

U.S. PATENT DOCUMENTS

| | | | |
|---|---|---|---|
| 6,707,487 B1 | 3/2004 | Aman et al. | |
| 6,738,532 B1* | 5/2004 | Oldroyd | G06K 9/6203 345/634 |
| 2013/0266177 A1* | 10/2013 | Sanches | G06K 9/00805 382/103 |
| 2016/0239944 A1* | 8/2016 | Bedi et al. | G06K 9/6201 |

FOREIGN PATENT DOCUMENTS

| | | |
|---|---|---|
| WO | 2012/100819 A1 | 8/2012 |
| WO | 2013/102488 A1 | 7/2013 |

OTHER PUBLICATIONS

"Telecom Italia at TRECVID2014—Instance Search Task" by Luca Bertinetto, Massimo Balestri, Skjalg Lepsøy, Gianluca Francini, Enrico Magli, and Miroslaw Bober, Nov. 2014 TREC Video Retrieval Evaluation.

"The Visual Internet of Things System Based on Depth Camera" by Xucong Zhang, Xiaoyun Wang, Yingmin Jia, Proceedings of 2013 Chinese Intelligent Automation Conference, pp. 447-455, Jul. 11, 2013.

"Kinsight: Localizing and Tracking Household Objects Using Depth-Camera Sensors" by Shahriar Nirjon and John A. Stankovic, 2012 IEEE 8th International Conference on Distributed Computing in Sensor Systems (DCOSS), May 16-18, 2012.

"Random Sample Consensus: A Paradigm for Model Fitting with Applications to Image Analysis and Automated Cartography" by Martin A. Fischler & Robert C. Bolles, Communications of the ACM, vol. 24 Issue 6, pp. 381-395, Jun. 1981.

Anonymous: "computer vision—Image matching and object detection, how to perform detection for small object?—Stack Overflow", Stack Overflow, Nov. 28, 2014, XP055410697, retrieved Sep. 27, 2017 from <https://stackoverflow.com/questions/27184836/image-matching-and-object-detection-how-to-perform-detection-for-small-object>.

Bernt Schiele et al, "High Level Computer Vision Sliding Window Detection: Viola-Jones-Detector & Histogram of Oriented Gradients (HOG)", Jun. 5, 2013, 74 pages, XP055410856, retrieved Sep. 28, 2017 from <https://www.mpi-inf.mpg.de/fileadmin/inf/d2/HLCV/cv-ss13-0605-sliding-window.pdf>.

Sanja Fidler, "Object Detection Sliding Windows", Nov. 25, 2014, pp. 12, 35-41 (52 pages), XP055410908, retrieved Sep. 28, 2017 from <http://www.cs.utoronto.ca/~fidler/slides/CSC420/lecture17.pdf>.

Duan Ling-Yu et al, "Overview of the MPEG-CDVS Standard", IEEE Transactions on Image Processing, IEEE Service Center, Piscataway, NJ, US, Jan. 1, 2016, vol. 25, No. 1, pp. 179-194, XP011594018.

(Continued)

Primary Examiner — Andrew W Johns
(74) Attorney, Agent, or Firm — Banner & Witcoff, Ltd.

(57) ABSTRACT

A monitoring system assesses the position of at least one target within an area. The monitoring system comprises a processing unit adapted to receive, from a camera, at least a frame depicting a scene of the area. The frames generated by the camera have a first resolution. The processing unit comprises: a database module storing, for each at least one target, a corresponding reference image, each reference image having a second resolution lower than the first resolution; a segmentation module configured to segment a received frame into frame segments, each frame segment having a resolution corresponding to the second resolution; a search module configured to implement a visual search procedure between each frame segment and a reference image comprising a depiction of the at least one target; and a position and translation module for calculating the position of the at least one target within the received frame.

19 Claims, 4 Drawing Sheets

(56) References Cited

OTHER PUBLICATIONS

Samarth Brahmbhatt, "Object detection", Sep. 11, 2014, XP055410902, retrieved Sep. 28, 2017 from <htttps://www.cc.gatech.edu/~afb/classes/CS7495-Fall2014/presentations/Brahmbhatt-detection.pdf>.

Oct. 6, 2017—(WO) International Search Report and Written Opinion—App PCT/EP2016/082710.

* cited by examiner

METHOD AND SYSTEM FOR IDENTIFYING TARGETS IN SCENES SHOT BY A CAMERA

BACKGROUND OF THE INVENTION

Field of the Invention

The present invention refers to the visual search field. More particularly, the present invention relates to a method and a system for identifying predefined targets in scenes shot by one or more cameras and for determining the relative position of such predefined targets in the scenes.

Overview of the Related Art

Driven by recent advances in digital video cameras design and video management systems, efficiency and reliability of video monitoring systems is increasing. In the present description, by "video monitoring system" it is intended any system adapted to monitor an area through the inspection of pictures or videos captured by a camera directed to search for particular types of content, such as the presence of specific targets, and their locations within the monitored area.

The simplest kind of video monitoring systems requires a user or users to manually inspect the video captured by the camera in order to search for the video content corresponding to desired target(s). While a video monitoring system of this kind is very proficient at interpreting video content, it is also typically limited in capacity to reviewing captured videos at speeds near real-time, depending on the level of activity in the scene. As a result, searching can be a slow and cumbersome process. In addition, the human attention span does not persist at full capacity over long time periods.

For this purpose, automated video monitoring systems have been developed, which can carry out the inspection of the captured video without the need of a human operator, by carrying out one of the known automated visual search procedures, such as for example the MPEG-7 CDVS (Compact Descriptors for Visual Search) procedure. As it is well known to those skilled in the art, automated visual search procedures provide for the identification of a specific target in an image (a picture or a frame of a video) by comparing said image with a known reference image depicting such specific target.

Paper "*Telecom Italia at TRECVID2014—Instance Search Task*" by Luca Bertinetto, Massimo Balestri, Skjalg Lepsøy, Gianluca Francini, Enrico Magli, and Miroslaw Bober, November 2014 TREC Video Retrieval Evaluation, relates to extraction of parameters from single images, as well as the binary representation of these parameters specified in CDVS. The software that embodies the CDVS also provides exemplary modules for image comparison, index construction, and object retrieval.

Paper "*The Visual Internet of Things System Based on Depth Camera*" by Xucong Zhang, Xiaoyun Wang, Yingmin Jia, Proceedings of 2013 Chinese Intelligent Automation Conference, pages 447-455, 11 Jul. 2013, relates to Visual Internet of Things. This paper proposes to strengthen the system with atomic visual label by taking visual camera as the sensor. Since the traditional color camera is greatly influenced by the condition of illumination, and suffers from the low detection accuracy, according to this paper, a new Visual Internet of Things with depth camera is proposed, which takes advantage of the illumination invariant of depth information and rich texture of color information to label the objects in the scene. Microsoft Kinect has been used as the sensor to get the color and depth information of the scene, modify the traditional computer vision technology for the combinatorial information to label target object, and return the result to user interface.

Paper "*Kinsight: Localizing and Tracking Household Objects Using Depth-Camera Sensors*" by Shahriar Nirjon and John A. Stankovic, 2012 IEEE 8th International Conference on Distributed Computing in Sensor Systems (DCOSS), 16-18 May 2012, faces the problem of localizing and tracking household objects using a depth-camera sensor network. In this paper, a system called Kinsight has been designed and implemented to track household objects indirectly—by tracking human figures, and detecting and recognizing objects from human-object interactions. Two algorithms have been devised: (1) Depth Sweep—that uses depth information to efficiently extract objects from an image, and (2) Context Oriented Object Recognition—that uses location history and activity context along with an RGB image to recognize object at home.

U.S. Pat. No. 6,707,487 discloses a system for tracking the movement of multiple objects within a predefined area using a continuation of overhead X-Y tracking cameras with attached frequency selective filter. Also employed are perspective Z filming cameras sets. Objects to be tracked, such as player, have been marked to include some form of frequency selective reflective material such as an ink. Typical markers include patches and, sticker and tape as well as additional body joint markers through. System radiates selected energy throughout the predefined area of tracking that is specifically chosen to reflect off said reflective materials used to mark for instance player. The reflected energy is then received by tracking cameras while all other ambient light is blocked by filter. Local Computer System continuously captures images from said tracking cameras which include only the minimum information created by said reflected energy. System efficiently locates said markings on said multiple objects and uses this location information to determine for each marking its angle of rotation, angle of azimuth and distance from a designated origin local to player. Local origin is then expressed as a three-dimensional coordinate with respect to the origin of the playing venue. The continuous stream of tracked three-dimensional coordinates, defining the body joints on players such as, is then transmitted to a remote computer where it can be used to drive a graphic re-animation of the object movement. Along with this re-animation, additional performance measurements may be derived from the continuous stream and automatically made available in real-time.

SUMMARY OF THE INVENTION

The Applicant has found that the known solutions mentioned above are not satisfactory since they are not capable of efficiently determining the position of known targets within an image when such targets have sizes that are sensibly smaller than the size of the image as a whole.

Paper "*Telecom Italia at TRECVID2014—Instance Search Task*" simply faces the problem of how managing the presence of small objects in reference images only, and not in the images belonging to the captured video to be inspected.

Papers "*The Visual Internet of Things System Based on Depth Camera*" and "*Kinsight: Localizing and Tracking Household Objects Using Depth-Camera Sensors*" are neither efficient nor cost-effective, since they require an additional dedicated measuring device in addition to the camera which captures the video to be inspected.

U.S. Pat. No. 6,707,487 provides for determining the position of generic objects which are moving in a determined area. This proposal solves the problem of detecting any kind of object, also small ones, by marking (i.e., modifying or adapting) them with a specific ink or a reflective patch. This technique cannot be used with everyday objects that the user doesn't want to modify or cannot provide with a marking.

Applicant has ascertained that since a monitoring system based on automated visual search procedures—which provide for comparing an image taken by a camera with a reference image—usually exploits reference images having resolutions that are far lower than the ones of the camera, carrying out a simple downscaling of the image taken by the camera before carrying out the comparison with the reference image may impair the outcome of the automated visual search. Indeed, a target which occupies a small portion of the original picture taken by the camera (e.g., corresponding to a small object and/or to an object which is far from the camera), may become unrecognizable after the downscaling of the image.

In view of the above, the Applicant has devised a monitoring system capable of efficiently determining the position of targets within an image when such targets have sizes that are sensibly smaller than the size of the image as a whole.

In principle, the solution according to an embodiment of the present invention provides for segmenting the image taken by the camera in image segments having a resolution corresponding to the one of the reference image, and carrying out the visual search operations between the image segments and the reference image. In this way, details pertaining to small objects depicted in the starting image taken by the camera are not lost.

An aspect of the present invention relates to a monitoring system for assessing the position of at least one target within an area. The monitoring system comprises a processing unit adapted to receive from a camera at least a frame depicting a scene of the area. The frames generated by the camera have a first resolution. The processing unit comprises:
- a reference image database module storing for each one of the at least one target a corresponding reference image comprising a depiction of said at least one target, each reference image having a second resolution lower than the first resolution;
- a segmentation module configured to segment a received frame into a corresponding set of frame segments, each frame segment having a resolution corresponding to the second resolution;
- a visual search module configured to carry out a visual search procedure between each frame segment and a reference image comprising a depiction of the at least one target to assess whether said frame segment depicts an image corresponding to at least a portion of the at least one target depicted in said reference image;
- a position and translation module for calculating the position of the at least one target within the received frame.

According to an embodiment of the present invention, the processing unit is configured to determine the position of the at least one target within the monitored area based on the position of the at least one target within the received frame calculated by the position and translation module.

According to an embodiment of the present invention, the position and translation module comprises a position module configured to calculate the position of an image corresponding to at least a portion of the at least one target within an assessed frame segment which has been assessed to depict said image corresponding to a portion of the at least one target.

According to an embodiment of the present invention, the position module is configured to calculate the coordinates, with respect to a reference system of the assessed frame segment, of a bounding box enclosing the image corresponding to said at least a portion of the at least one target.

According to an embodiment of the present invention, the position and translation module further comprises a translation module for translating the coordinates of the bounding box calculated by the position module from the reference system of the assessed frame segment to a reference system of the received frame.

According to an embodiment of the present invention, the position and translation module comprises a position module configured to:
- select a set of frame segments, each frame segment of the segment being an assessed frame segment which has been assessed to depict a respective image corresponding to a respective portion of the at least one target;
- calculate for each frame segment of the set a corresponding position of the respective image within said frame segment.

According to an embodiment of the present invention, the position module is configured to calculate for each frame segment of the set of frame segments the coordinates, with respect to a reference system of said frame segment, of a corresponding bounding box enclosing the respective image corresponding to the respective portion of the at least one target.

According to an embodiment of the present invention, the position and translation module further comprises a translation module configured to:
- translate the coordinates of each bounding box calculated by the position module corresponding to the frame segments of the set of frame segments from the reference system of said frame segment to a reference system of the received frame.

According to an embodiment of the present invention the translation module is further configured to carry out a consistency check after the translation of coordinates of each bounding box from the reference system of said frame segment to the reference system of the received frame to assess whether the bounding boxes obtained after the translation of coordinates overlap to each other by an amount higher than a percentage threshold of their areas.

According to an embodiment of the present invention, the translation module is further configured to generate a composite bounding box enclosing an image corresponding to the at least one target by joining to each other the bounding boxes corresponding to each frame segment of the set of frame segments translated in the reference system of the received frame.

According to an embodiment of the present invention said visual search procedure is the MPEG-7 CDVS procedure.

Another aspect of the present invention relates to a method for assessing the position of at least one target within an area. The method comprises:
- receiving from a camera at least a frame depicting a scene of the area, said at least a frame having a first resolution;
- segmenting a received frame into a corresponding set of frame segments;
- carrying out a visual search procedure between each frame segment and a reference image comprising a depiction of the at least one target to assess whether said frame segment depicts an image corresponding to at least a portion of the at least one target depicted in said reference image, said reference image having a second resolution lower than the first resolution;

calculating the position of the at least one target within the received frame.

According to an embodiment of the present invention, said segmenting the received frame into a corresponding set of frame segments comprises segmenting the received frame so that each frame segment has a resolution corresponding to the second resolution.

According to an embodiment of the present invention, the method further comprises determining the position of the at least one target within the monitored area based on the calculated position of the at least one target within the received frame.

According to an embodiment of the present invention, said calculating the position of the at least one target within the received frame comprises calculating the position of an image corresponding to at least a portion of the at least one target within an assessed frame segment which has been assessed to depict said image corresponding to a portion of the at least one target.

According to an embodiment of the present invention said calculating the position of the at least one target within the received frame further comprises calculating the coordinates, with respect to a reference system of the assessed frame segment, of a bounding box enclosing the image corresponding to said at least a portion of the at least one target.

According to an embodiment of the present invention said calculating the position of the at least one target within the received frame further comprises translating the coordinates of the calculated bounding box from the reference system of the assessed frame segment to a reference system of the received frame.

According to an embodiment of the present invention, said calculating the position of the at least one target within the received frame comprises:

selecting a set of frame segments, each frame segment of the segment being an assessed frame segment which has been assessed to depict a respective image corresponding to a respective portion of the at least one target;

calculating for each frame segment of the set a corresponding position of the respective image within said frame segment by calculating for each frame segment of the set of frame segments the coordinates, with respect to a reference system of said frame segment, of a corresponding bounding box enclosing the respective image corresponding to the respective portion of the at least one target.

According to an embodiment of the present invention said calculating the position of the at least one target within the received frame comprises:

translating the coordinates of each bounding box calculated by the position module corresponding to the frame segments of the set of frame segments from the reference system of said frame segment to a reference system of the received frame;

generating a composite bounding box enclosing an image corresponding to the at least one target by joining to each other the bounding boxes corresponding to each frame segment of the set of frame segments translated in the reference system of the received frame.

According to an embodiment of the present invention, the method further comprises carrying out a consistency check after the translation of coordinates of each bounding box from the reference system of said frame segment to the reference system of the received frame to assess whether the bounding boxes obtained after the translation of coordinated overlap to each other by an amount higher than a percentage threshold of their areas.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION

Figure 1:
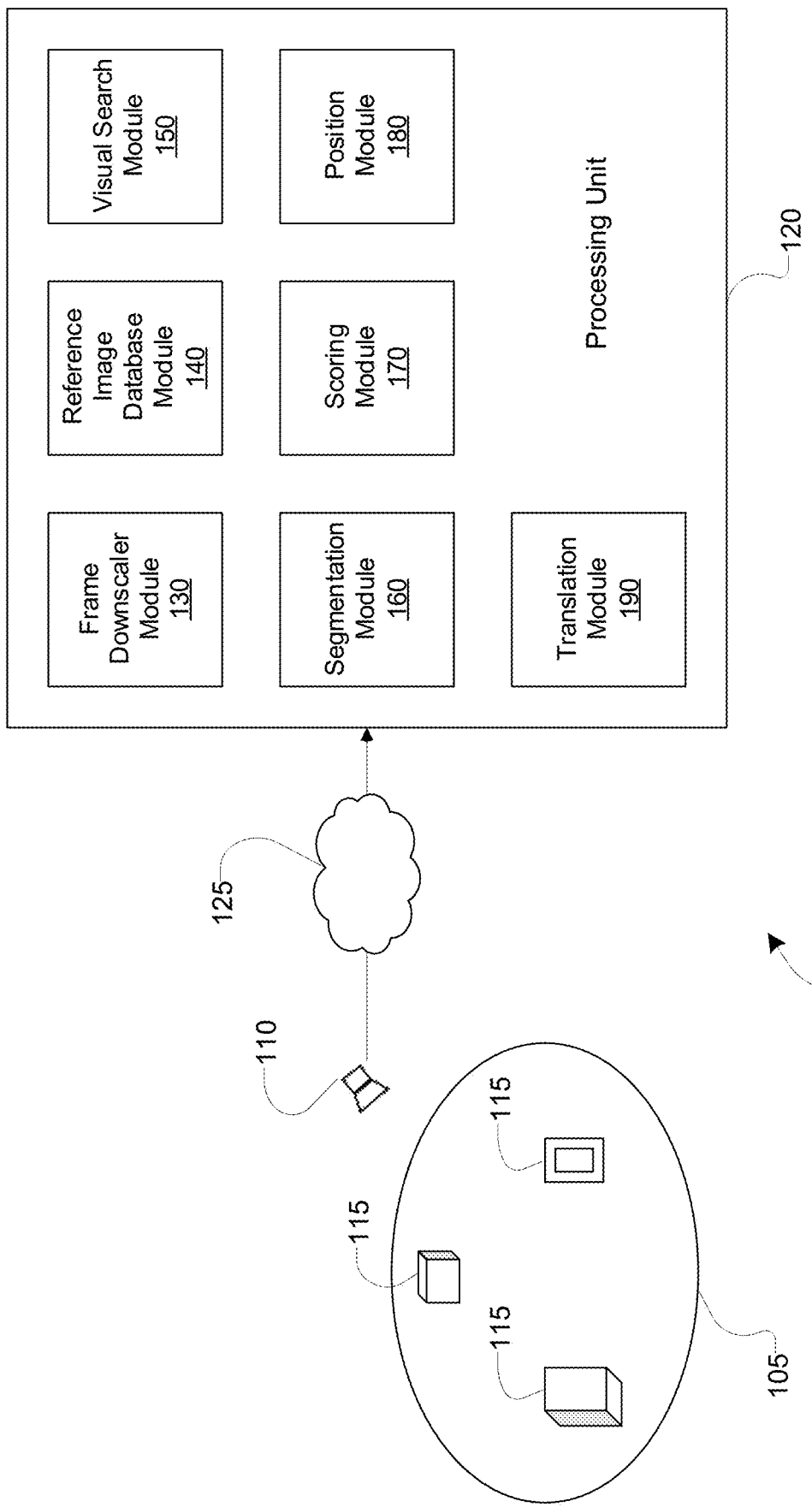
FIG. 1 schematically illustrates in terms of functional blocks the main components of a video monitoring system according to an embodiment of the present invention.

With reference to the drawings, FIG. 1 depicts in terms of functional blocks the main components of a video monitoring system 100 according to an embodiment of the present invention.

The video monitoring system 100 is configured to monitor an area 105, e.g., a portion of a street, a room of a building, a warehouse, etc., by inspecting video captured by one or more cameras 110 (only one depicted in figure) in order to search for the presence of specific targets 115 in the monitored area 105 and to determine the locations of such specific targets within the monitored area 105. In the present description, with the term "target" it is intended a generic object such as goods or furniture, depending on the context wherein the video monitoring system 100 is used and the purpose of the latter.

For example, the area 105 may be a warehouse, and the targets 115 may be stocked goods. As another example, the area 105 may be a room, and the targets 115 may be objects located in the room.

The camera 110 is configured to shot video scenes of the area 105 to generate a corresponding video consisting of a sequence of frames depicting a scene of the area 105. The generic frame of the sequence is identified as Q(X), wherein X is the resolution of the frame, to be intended as the total number of pixels in the frame, for example calculated by multiplying the pixel columns by the pixel rows thereof. Naturally, similar considerations apply if the resolution X of the frame is calculated in another way.

According to an embodiment of the present invention, the video monitoring system 100 further comprises a processing unit 120 adapted to receive the frames Q(X) from the camera 110 and to process said frames Q(X) for assessing whether a specific target 115 is depicted in a frame Q(X) (meaning that such specific target was located in the monitored area 105 at the time said frame Q(X) was captured), and, in case the presence of such target 115 has been positively assessed, for determining the location of such specific target within said frame Q(X) (and therefore the position of the target 115 within the monitored area 105).

It should be noted that the terms 'system', 'module', 'unit' are herein intended to comprise, but not limited to, hardware, firmware, a combination of hardware and software, or software.

For example, a system, a module or a unit may be, but is not limited to being, a process running on a processor, an object, an executable, a thread of execution, a program, and/or a computing device.

In other words, a system, a module or a unit may comprise an application being executed on a computing device and/or the computing device itself.

One or more systems, modules or units may be localized on one computing device and/or distributed between two or more computing devices.

Systems, modules or units may comprise and/or interact with computer readable media having storing data according to various data structures.

The systems, modules or units may communicate by exploiting local and/or remote processes, preferably by means of electrical, electromagnetic and/or optical signals providing one or more data packets, such as data packets from one node, system or module interacting with another node, system or module in a local system, in a distributed system, and/or across a radio network and/or a wired network.

According to an embodiment of the present invention, the processing unit 120 may be directly coupled (e.g., wired) to the camera 110, such as for example in case the processing unit 120 and the camera 110 are physically located close to each other or in a same zone.

According to another embodiment of the present invention, the processing unit 120 and the camera 110 are remotely connected through a communication network 125 (such as the Internet).

The processing unit 120 according to an embodiment of the present invention comprises the following modules, whose operation will be described in the following of the present description:

- A frame downscaler module 130 adapted to downscaling the frames Q(X).
- A reference image database module 140 adapted to store reference images of the targets 115. Such reference images have a resolution M, and are identified as R(M).
- A visual search module 150 adapted to implement an automated visual search procedure, such as for example the previously mentioned MPEG-7 CDVS procedure, or any one among the visual search procedures known in the art.
- A segmentation module 160 adapted to segment frames Q(X) into a corresponding set of frame segments Qi(X') having a lower resolution X'<X.
- A scoring module 170 adapted to generate likeliness scores for the outcomes of the visual search procedures carried out by the visual search module 150.
- A position module 180 adapted to calculate the position of identified targets 115 within a frame Q(X) or a frame segment Qi(X').
- A translation module 190 adapted translate the position of an identified target 115 within a frame segment Qi(X') calculated by the position module 180 into a corresponding position within a frame Q(X).

It has to be appreciated that according to other embodiments of the present invention some of the previously listed modules may not be directly included in the processing unit 120, but may be located elsewhere, such as for example belonging to other processing units and/or remotely connected through a communication network, such as the Internet. Moreover, the very specific subdivision in modules listed above may be altered, for example with some of the modules that are combined to each other to form macro modules.

In a real scenario, the video of the area 105 captured by the camera 110 comprises a sequence of frames Q(X) having a resolution X=N, wherein N is higher than M. Possible exemplary values for N may comprise 1920×1080 (Full HD) and 3840×2160 (UHD). Indeed, while modern cameras 110 are typically capable of capturing videos at relatively high resolutions N, the reference images R(M) of the targets 115 stored in the reference image database module 140 usually have substantially lower resolutions M, such as 640×480 pixels. It has to be noted that each reference image R(M) usually depicts the corresponding target only, meaning that the majority of its pixels belong to a depiction of the target. Making reference to the abovementioned MPEG-7 CDVS procedure, such low resolutions M originate from selecting the reference images R(M) from visual search reference databases, which, as it is well known to those skilled in the art, force the use of low resolutions reference images for saving memory space and reducing the duration and the complexity of the operations used for training the visual search reference database.

Figure 2A:
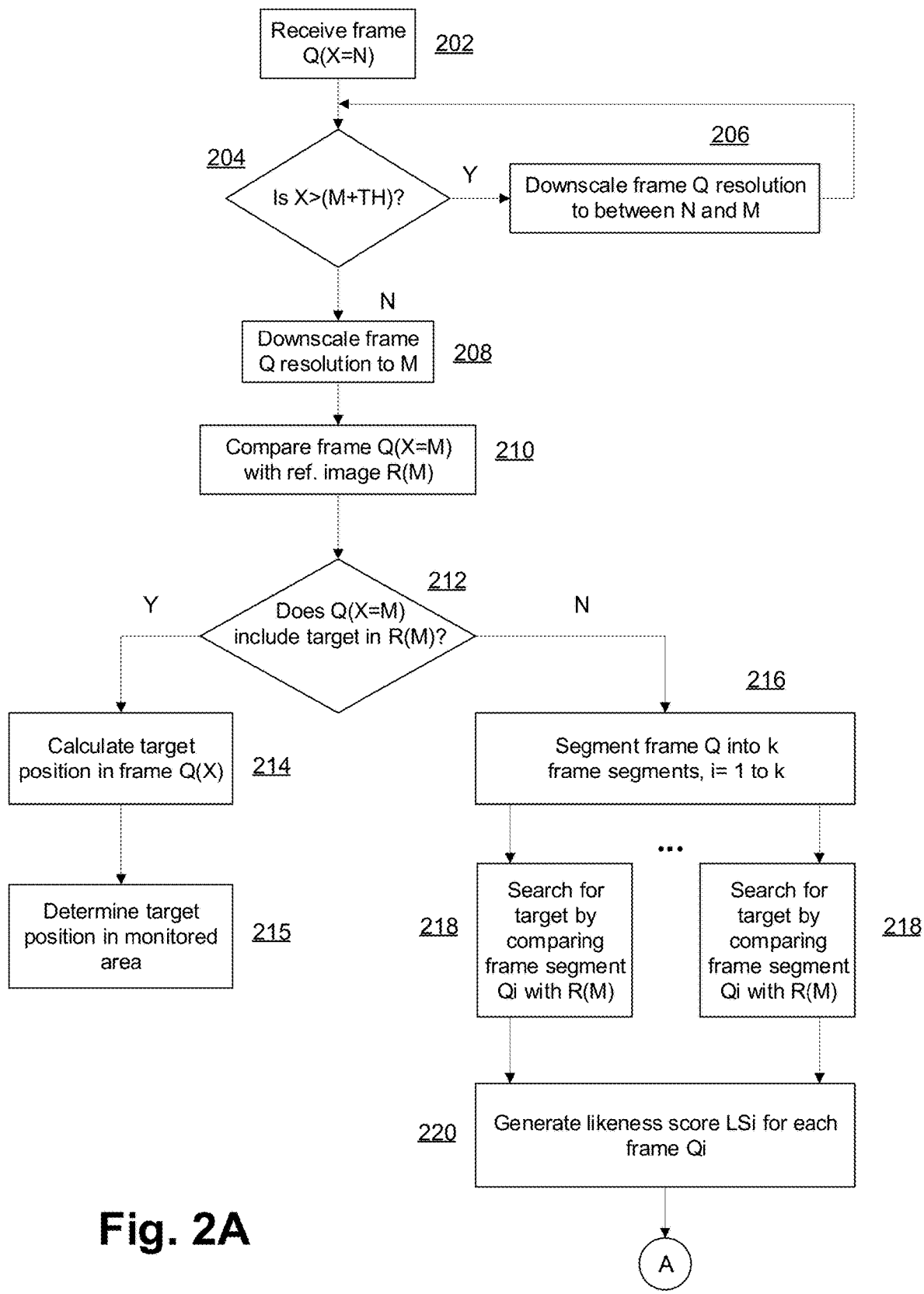
FIGS. 2A and 2B depict a schematic flow chart illustrating the main operations of a monitoring procedure carried out by the monitoring system of FIG. 1, according to an embodiment of the present invention.
Figure 2B:
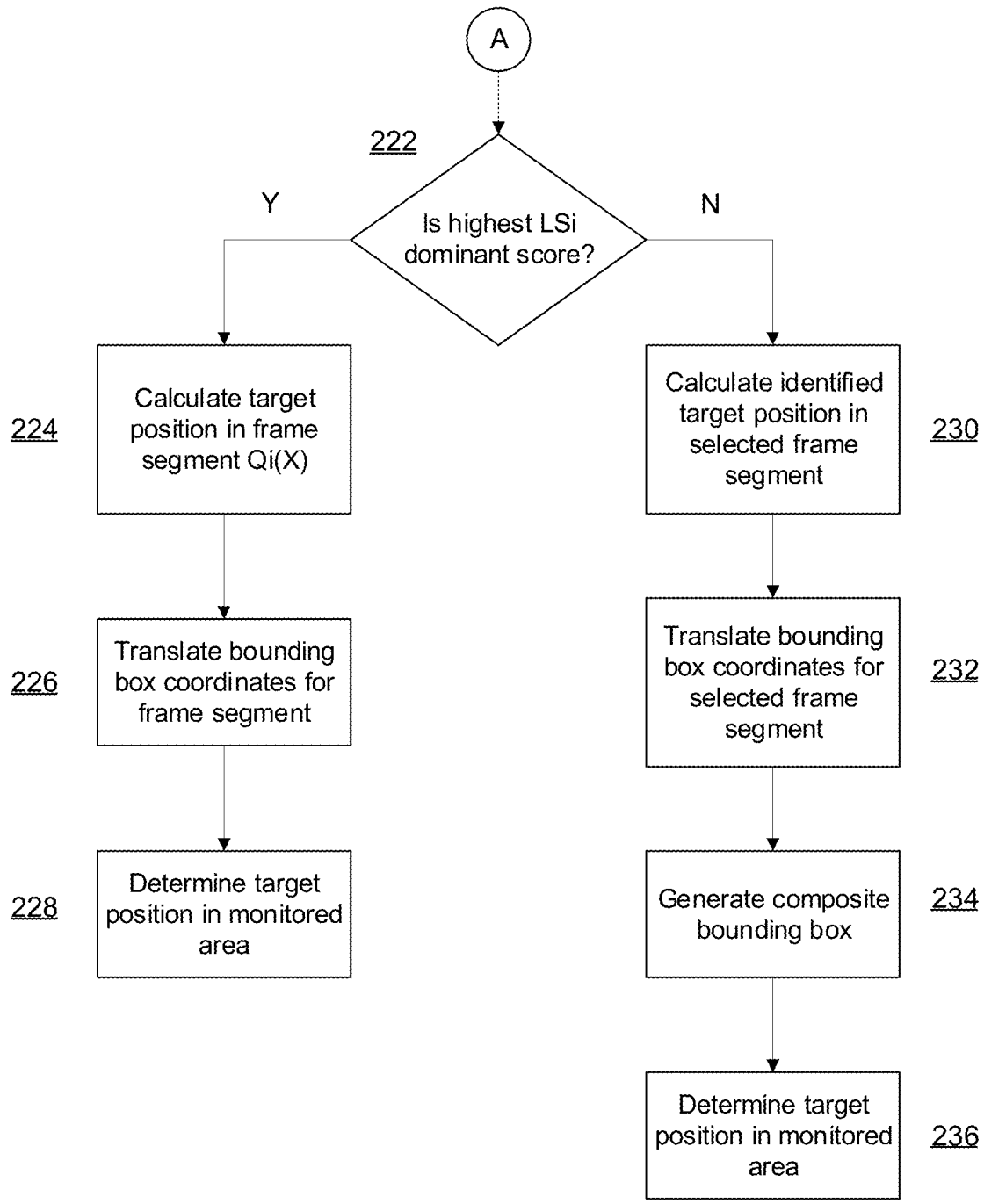

FIGS. 2A and 2B depict a schematic flow chart 200 illustrating the main operations of a monitoring procedure carried out by the monitoring system 100 for monitoring the area 105 for the purpose of assessing the presence and the position of a specific target 115, according to an embodiment of the present invention. In this case, the reference image database module 140 stores a reference image R(M) depicting such specific target 115.

The processing unit 120 receives a frame Q(X=N) of the sequence, for example through the communication network 125 (block 202). The resolution N of the frame Q(X=N) is higher than the resolution M of the reference image R(M).

Then, a check is made to quantify the order of magnitude of the resolution difference between the resolutions X and M (block 204).

According to an embodiment of the present invention, if the resolution X is higher than resolution M by a threshold TH, such as for example if the resolution X is higher than resolution M by more than two times (exit branch Y of block 204), the frame downscaler module 130 carries out a downscaling operation, e.g., a downsampling operation, to downscale the frame Q to a lower intermediate resolution N' which is between N and M (block 206). At this point, a new check is made to quantify the order of magnitude of the resolution difference between the resolutions X=N' and M (return to block 204). The process is reiterated until the resolution X is assessed to be higher than resolution M by an amount lower than the threshold TH (exit branch N of block 204). Naturally, if the native camera resolution N was already higher than resolution M by an amount lower than the threshold TH, no preliminary downscaling is carried out.

This process of potentially reiterating a preliminary downscaling of the original frame Q(X=N) is advantageously carried out for reducing the resolution difference between the frame and the reference image, in order to improve the reliability of the visual search operations that will be carried out in the following, especially in case the target 115 to be identified is small (or far from camera). However, according to another embodiment of the present invention, such preliminary downscaling may be skipped.

According to an embodiment of the present invention, before carrying out visual search operation on the frame Q(X) (either at the native camera resolution X=N or at the preliminary downscaled resolution X=N'), the monitoring procedure provides for a first tentative in which a visual search procedure is carried out by comparing the reference image R(M) with a version of the frame Q(X) which has been directly downscaled to a resolution similar to the resolution M of the reference image R(M), for example such that the number of pixels of the downscaled version is of the same order of magnitude of the number of pixels od the reference image R(M) (e.g., 640×480 and 500×500 pixels, respectively). Purpose of such first tentative is to speed up the monitoring operations for obtaining a result right away in case the target 115 is depicted particularly large with respect the size of the frame Q(X), such as for example when the target 115 is physically located very close to the camera 110.

For this purpose, according to an embodiment of the present invention, the frame downscaler module 130 carries out a (further) downscaling operation, to downscale the frame Q to the resolution M (block 208).

At this point, the visual search module 150 executes an automated visual search procedure, such as for example the previously mentioned MPEG-7 CDVS procedure, by comparing the frame Q(X=M) downscaled at the resolution M with the reference image R(M) (block 210) for searching an image of the target 115 in the downscaled frame Q(X=M).

If the visual search module 150 has assessed that in the frame Q(X=M) it is depicted an image corresponding to the target 115 depicted in the reference image R(M) (exit branch Y of block 212), it means that such target 115 was located in the monitored area 105 at the time said frame Q(X) was captured. In this case, the position module 180 calculates the position of the identified target 115 within the frame Q(X) (block 214), for example by calculating the coordinates (with respect to the reference system of the frame Q(X)) of the bounding box enclosing the target 115 depiction in the frame Q(X). The bounding box coordinates calculation is carried out according to any one among the bounding box calculation procedures known in the art, such as for example the Random sample consensus (RANSAC) geometric consistency check test disclosed in "*Random Sample Consensus: A Paradigm for Model Fitting with Applications to Image Analysis and Automated Cartography*" by Martin A. Fischler & Robert C. Bolles, Communications of the ACM, Volume 24 Issue 6, Pages 381-395, June 1981 and/or the geometric consistency check disclosed in the patent applications PCT/EP2011/050994 and PCT/EP2012/050025. In any case, similar considerations apply in case the position of the identified target 115 within the frame Q(X) is calculated in another way.

Based on the position of the bounding box within the frame Q(X), the monitoring system 120 determines (block 215) the position of the target 115 within the monitored area 105.

If instead the visual search module 150 did not succeed in assessing within the downscaled frame Q(X=M) the presence of an image corresponding to the target 115 depicted in the reference image R(M) (exit branch N of block 212), it does not necessarily mean that a depiction of such target 115 is not present in the downscaled frame: it might mean that the size of the depiction of the target 115 within the frame Q(X=M) is too small for being properly recognized by the automated visual search procedure carried out by the visual search module 150. This may be the case in which the target 115 has a small size and/or is physically located in the area 105 far from the camera 110.

In this case, according to an embodiment of the present invention, the monitoring procedure provides for carrying out visual search operations by exploiting the frame Q(X=N) at the original, native camera resolution N, or—if present—by exploiting the frame Q(X=N') at the last intermediate resolution N'.

According to an embodiment of the present invention, the segmentation module 160 segments the frame Q(X=N) or Q(X=N') into a corresponding set of k frame segments Qi(X=M), i=1 to k, having the same resolution M of the reference image R(M) (block 216).

According to an embodiment of the invention, the segmentation is carried out by the segmentation module 160 by scanning the frame Q(X=N) or Q(X=N') with a movable window W having a resolution M, which movable window W is overlapped to the frame Q(X=N) or Q(X=N') and then is progressively shifted step-by-step to scan the entire area of the frame Q(X=N) or Q(X=N'). Each frame segment Qi(X=M) is obtained by considering the portion of the Q(X=N) or Q(X=N') which is overlapped by the window W during a step of the scanning sequence.

Figure 3:
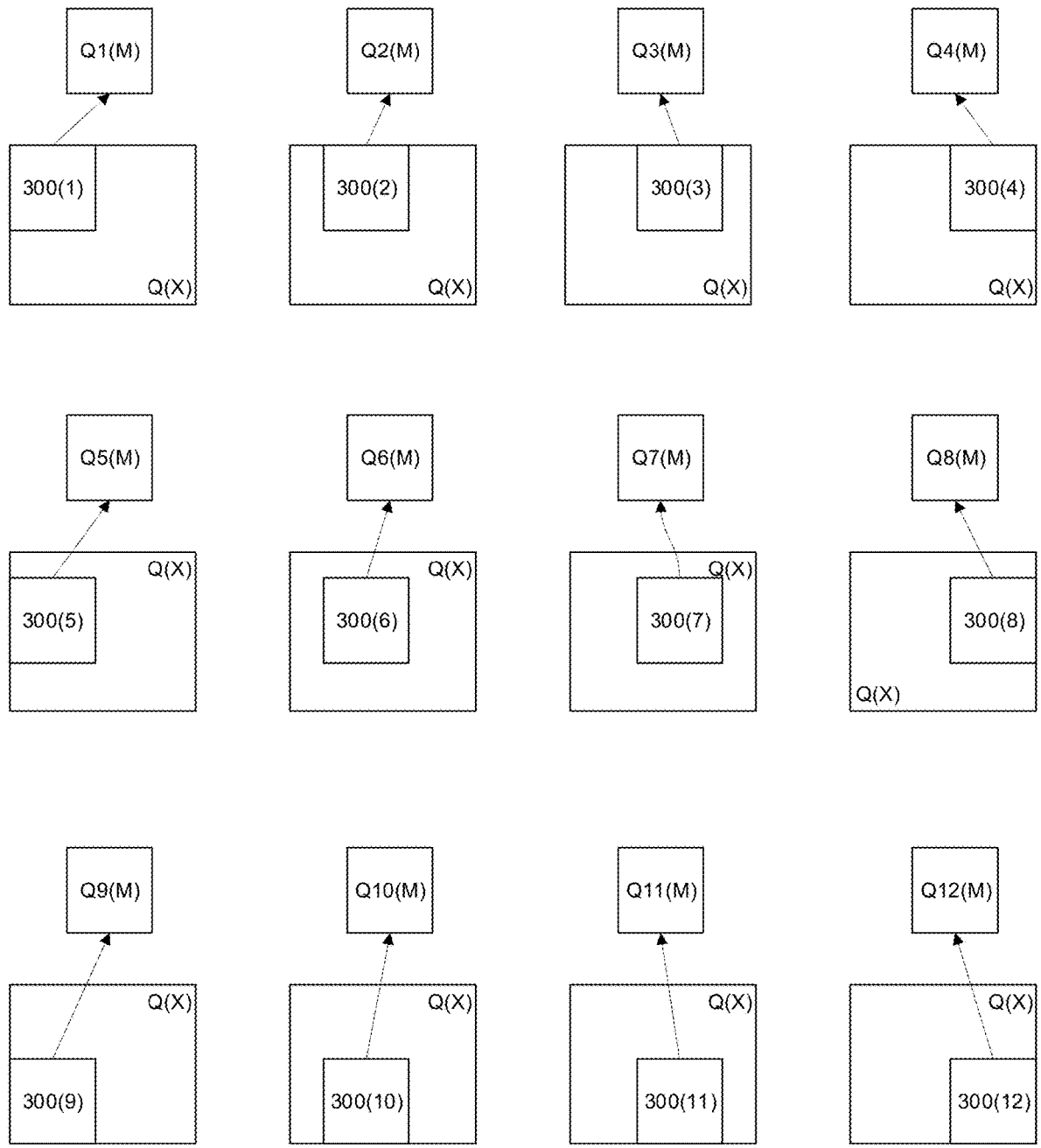
FIG. 3 illustrates an exemplificative scanning sequence carried out by the monitoring system of FIG. 1, according to an embodiment of the present invention.

In the exemplary but not limitative example illustrated in FIG. 3, the scanning sequence provides for positioning the window W at the upper-left corner of the frame Q(X=N) or Q(X=N') (in the example of FIG. 3, the frame Q(X=N) or Q(X=N') is identified as Q(X), the window W position is identified with reference 300(1), and the corresponding frame segment is identified as Q1(M)) and then shifting step-by-step the window W toward the right direction (positions 300(2), 300(3), . . . , and corresponding frame segments Q2(M), Q3(M)) until reaching the upper-right corner (position 300(4) and corresponding frame segment Q4(M)). At this point, the window W is repositioned on the left side of the frame Q(X=N) or Q(X=N'), but at a lower position compared to the first position (position 300(5), frame segment Q5(M)), and then it is shifted step-by-step toward the right direction (positions 300(6), 300(7), . . . , and corresponding frame segments Q6(M), Q7(M)) until reaching the right border (position 300(8), and corresponding frame segment Q8(M)). This process is reiterated until the lower-right corner of the frame Q(X=N) or Q(X=N') is reached (position 300(12), and corresponding frame segment Q12(M)), i.e., until all the area of the frame Q(X=N) or Q(X=N') has been scanned. Naturally, this very specific scanning sequence is only one of the possible scanning sequences that may be carried out. For example, the concepts of the present invention may be applied to a scanning sequence which provides for a first step in which the window W is positioned at the upper-right corner of the frame Q(X=N) or Q(X=N'), and then is shifted in the left direction, or a scanning sequence which provides for scanning the frame Q(X=N) or Q(X=N') according to a column-row sequence instead of a row-column one.

According to an embodiment of the present invention, portions of the frame Q(X=N) or Q(X=N') selected by two or more different positions of the window W during the scanning sequence are partially overlapped to each other, in order to take into account possible target 115 images located "astride" two or more of such portions. For example, according to an embodiment of the present invention, two consecutive window W positions (e.g., positions 300(1), and 300(2)) located on a same row may provide for a common overlapped area located at that row (for example, having a size corresponding to half the window W area), or two window W positions (e.g., positions 300(1) and 300(5)) located on a same column may provide for a common overlapped area located at that column.

According to an embodiment of the present invention, once the set of k frame segments Qi(X=M) i=1 to k is generated, the visual search module 150 executes an automated visual search procedure by comparing each one of said frame segments Qi(X=M) with the reference image R(M) (block(s) 218) for searching an image of the target 115 in the frame segments Qi(X=M). According to an embodiment of the present invention, the automated visual search procedure is carried out by visual search module 150 concurrently for all the frame segments Qi(X=M) of the set. According to another embodiment of the present invention, the automated visual search procedure is carried out by visual search module 150 sequentially, for example starting from the first frame segment Q1(X=M) until reaching the last one Qk(X=M). Intermediate solutions are also contemplated, wherein groups of frame segments Qi(X=M) are concurrently analyzed.

Unlike the previous automated visual search procedure performed at block 210, wherein the reference image R(M) has been compared with a downscaled version Q(X=M) of the whole starting frame, the outcomes of the automated visual search procedures carried out at block(s) 218 are more detailed and precise, since each frame segment Qi(X=M) relates to a portion of the original frame which is not subjected to a strong downscaling capable of causing the loss of important image details.

Then, according to an embodiment of the present invention, the scoring module 170 generates a corresponding likeliness score LSi for the outcome of each automated visual search procedure carried out by the visual search module 150 for each frame segment Qi(X=M) (block 220). Scoring can be performed, as a non limitative example, by taking into account the percentage of the number of target image "key points" matching into the reference image. Key point is a (well known for those skilled in the art) point in a picture whose position is calculated to be invariant to rotations, translation, zooming, cropping, brightness, contrast deformations. For example, the higher the likeliness of the image depicted in a frame segment Qi(X=M) to the image of the target 115 depicted in the reference image R(M), the higher the corresponding likeliness score LSi. According to an embodiment of the present invention, the scoring module 170 is configured to order the outcomes of the automated visual search procedures based on their likeliness scores LSi, for example according to a decreasing ordered score sequence.

If the highest likeliness score LSi of the score sequence is a dominant score, i.e., if the other likeliness scores LSi of the score sequence are far more lower (e.g., outside a given threshold range from the highest one) than the highest one (exit branch Y of block 222), it means that in the i-th frame segment Qi(X=M) corresponding to such highest likeliness score LSi it is depicted an image corresponding to the target 115 depicted in the reference image R(M), and it means that such target 115 was located in the portion of the monitored area 105 corresponding to the frame segment Qi(X=M) at the time the frame Q(X) was captured. In this case, the position module 180 calculates the position of the identified target 115 within said frame segment Qi(X=M) (block 224), by calculating the coordinates—with respect to the reference system of the frame segment Qi(X=M)—of the bounding box enclosing the target 115 depiction in the frame segment Qi(X=M).

In order to retrieve the position of the identified target 115 within the whole frame Q(X), and therefore, in order to retrieve the position of the target 115 within the monitored area 105, according to an embodiment of the present invention the translation module 190 translates the coordinates of the bounding box enclosing the target 115 depiction in the frame segment Qi(X=M) from the reference system of the frame segment Qi(X=M) to the reference system of the whole frame Q(X) (block 226). For example, the coordinates of the bounding box with respect to the frame segment Qi(X=M) are combined (e.g., added or subtracted) to coordinates identifying the position of the frame segment Qi(X=M) within the whole frame Q(X).

Based on the position of the bounding box within the frame Q(X), the monitoring system 120 determines (block 228) the position of the target 115 within the monitored area 105. For example, by knowing in advance the size and shape of the monitored area 105 and the position of the camera 110 with respect to the monitored area 105, as well as the optical features of the camera 110, a relationship may be calculated between positions within the frame Q(X) and position within the monitored area 105.

If the highest likeliness score LSi of the score sequence is not a dominant score, i.e., if there is at least one other likeliness score LSi of the score sequence having a value close to the highest one (e.g., comprised in a given threshold range from the highest one), or if there are two or more equal likeliness scores LSi that are higher than all the remaining likeliness scores LSi of the sequence (exit branch N of block 222), it means that in such frame segments Qi(X=M) having the highest likeliness scores LSi there are depicted at least portions of an image corresponding to the target 115 depicted in the reference image R(M). This means that such target 115 was located in the portion of the monitored area 105 corresponding to said frame segments Qi(X=M) at the time the frame Q(X) was captured. This is the case in which the image of the target 115 involves two or more frame segments Qi(X=M), for example because the image of the target is located astride two or more portions of the frame Q(X=N) corresponding to two or more corresponding frame segments Qi(X=M).

In view of the above, according to an embodiment of the present invention, the position module 180 selects a subgroup of frame segments Qi(X=M) having the highest likeliness scores LSi (e.g., comprised in a given threshold range from the highest one), and calculates for each selected frame segment Qi(X=M) the position of the identified (portion of the) target 115 within said frame segment Qi(X=M) (block 230). According to an embodiment of the present invention, this is done by calculating the coordinates—with respect to the reference system of such frame segment Qi(X=M)—of the bounding box enclosing (portion of) the target 115 depiction in such frame segment Qi(X=M).

In order to retrieve the position of the identified target 115 within the whole frame Q(X), and therefore, in order to retrieve the position of the target 115 within the monitored area 105, according to an embodiment of the present invention the translation module 190 translates the coordinates of each bounding box calculated for each frame segment Qi(X=M) of the selected sub-group from the reference system of such frame segment Qi(X=M) to the reference system of the whole frame Q(X) (block 232).

Then, the translation module 190 generates a composite bounding box (block 234) by joining to each other the bounding boxes (translated in the reference system of the whole frame Q(X)) calculated for the frame segments Qi(X=M) of the selected sub-group. Such composite bounding box is the bounding box enclosing the target 115 depiction in the whole frame Q(X) and corresponding to the union of the portions thereof depicted in the various frame segments Qi(X=M) of the selected sub-group.

In order to recognize and discard false-positive results, according to an embodiment of the present invention the translation module 190 may carry out a consistency check after the translations of the coordinates from the reference system of such frame segment Qi(X=M) to the reference system of the whole frame Q(X), which may provide for assessing whether the bounding boxes obtained after the coordinate translation overlap to each other by an amount higher than a percentage (e.g., 75%) of their areas.

Based on the position of the composite bounding box within the frame Q(X), the monitoring system 120 determines (block 236) the position of the target 115 within the monitored area 105.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

For example, although in the present description reference has been made to a reference image database module 140 comprising a single reference image R(M) for each specific target 115 to be monitored, the concepts of the present invention can be applied as well to the case in which two or more reference images R(M) of the same specific target 115 are provided, each one depicting the same specific target 115 from a different point of view. In this case, in order to recognize the presence (and the position) of that specific target 115, it is sufficient that the visual search module 150 assesses the matching of (a portion) of the frame with only one of the reference images R(M) corresponding to such specific target 115.

The invention claimed is:

1. A monitoring system for assessing a position of at least one target within an area, the monitoring system comprising a processing unit adapted to receive, from a camera, at least a frame depicting a scene of the area, the frames generated by the camera having a first resolution, the processing unit comprising:
   a reference image database storing, for each one of the at least one target, a corresponding reference image comprising a depiction of the at least one target, each reference image having a second resolution lower than the first resolution;
   one or more processors; and
   a non-transitory computer-readable medium having modules executable by the one or more processors, the modules comprising:
      a segmentation module configured to segment a received frame into a corresponding set of frame segments, each frame segment having a resolution corresponding to the second resolution;
      a visual search module configured to carry out a visual search procedure between each frame segment and a reference image comprising a depiction of the at least one target to assess whether said frame segment depicts an image corresponding to at least a portion of the at least one target depicted in said reference image; and
      a position and translation module for calculating a position of the at least one target within the received frame.

2. The monitoring system of claim 1, wherein the processing unit is configured to determine the position of the at least one target within the area based on the position of the at least one target within the received frame calculated by the position and translation module.

3. The monitoring system of claim 1, wherein the position and translation module comprises a position module configured to calculate a position of an image corresponding to at least a portion of the at least one target within an assessed frame segment which has been assessed to depict said image corresponding to a portion of the at least one target.

4. The monitoring system of claim 3, wherein the position module is configured to calculate coordinates, with respect to a reference system of the assessed frame segment, of a bounding box enclosing the image corresponding to said at least a portion of the at least one target.

5. The monitoring system of claim 4, wherein the position and translation module further comprises a translation module for translating the coordinates of the bounding box calculated by the position module from the reference system of the assessed frame segment to a reference system of the received frame.

6. The monitoring system of claim 1, wherein the position and translation module comprises a position module configured to:
   select a set of frame segments, each frame segment being an assessed frame segment which has been assessed to depict a respective image corresponding to a respective portion of the at least one target; and
   calculate for each frame segment of the set a corresponding position of the respective image within said frame segment.

7. The monitoring system of claim 6, wherein the position module is configured to calculate, for each frame segment of the set of frame segments, coordinates, with respect to a reference system of said frame segment, of a corresponding bounding box enclosing the respective image corresponding to the respective portion of the at least one target.

8. The monitoring system of claim 7, wherein the position and translation module further comprises a translation module configured to:
   translate the coordinates of each bounding box calculated by the position module corresponding to the frame segments of the set of frame segments from the reference system of said frame segment to a reference system of the received frame.

9. The monitoring system of claim 8, wherein the translation module is further configured to execute a consistency check after the translation of the coordinates of each bounding box from the reference system of said frame segment to the reference system of the received frame to assess whether the bounding boxes obtained after the translation of the coordinates overlap each other by an amount greater than a percentage threshold of their areas.

10. The monitoring system of claim 9, wherein the translation module is further configured to generate a composite bounding box enclosing an image corresponding to the at least one target by joining together the bounding boxes corresponding to each frame segment of the set of frame segments translated in the reference system of the received frame.

11. The monitoring system of claim 1, wherein said visual search procedure is MPEG-7 CDVS procedure.

12. A method for assessing a position of at least one target within an area, the method comprising:
receiving from a camera at least a frame depicting a scene of the area, the said at least a frame having a first resolution;
segmenting a received frame into a corresponding set of frame segments;
executing a visual search procedure between each frame segment and a reference image comprising a depiction of the at least one target to assess whether said frame segment depicts an image corresponding to at least a portion of the at least one target depicted in said reference image, said reference image having a second resolution lower than the first resolution; and
calculating the position of the at least one target within the received frame, wherein:
said segmenting the received frame into a corresponding set of frame segments comprises segmenting the received frame so that each frame segment has a resolution corresponding to the second resolution.

13. The method of claim 12, further comprising determining the position of the at least one target within the area based on the calculated position of the at least one target within the received frame.

14. The method of claim 12, wherein said calculating the position of the at least one target within the received frame comprises calculating a position of an image corresponding to at least a portion of the at least one target within an assessed frame segment which has been assessed to depict said image corresponding to a portion of the at least one target.

15. The method of claim 14, wherein said calculating the position of the at least one target within the received frame further comprises calculating coordinates, with respect to a reference system of the assessed frame segment, of a bounding box enclosing the image corresponding to said at least a portion of the at least one target.

16. The method of claim 15 wherein said calculating the position of the at least one target within the received frame further comprises translating the coordinates of the calculated bounding box from the reference system of the assessed frame segment to a reference system of the received frame.

17. The method of claim 12, wherein said calculating the position of the at least one target within the received frame comprises:
selecting a set of frame segments, each frame segment of the segment being an assessed frame segment which has been assessed to depict a respective image corresponding to a respective portion of the at least one target; and
calculating, for each frame segment of the set, a corresponding position of the respective image within said frame segment by calculating, for each frame segment of the set of frame segments, coordinates, with respect to a reference system of said frame segment, of a corresponding bounding box enclosing the respective image corresponding to the respective portion of the at least one target.

18. The method of claim 17, wherein said calculating the position of the at least one target within the received frame comprises:
translating the calculated coordinates of each bounding box corresponding to the frame segments of the set of frame segments from the reference system of said frame segment to a reference system of the received frame; and
generating a composite bounding box enclosing an image corresponding to the at least one target by joining together the bounding boxes corresponding to each frame segment of the set of frame segments translated in the reference system of the received frame.

19. The method of claim 18, further comprising carrying out a consistency check after the translation of the coordinates of each bounding box from the reference system of said frame segment to the reference system of the received frame to assess whether the bounding boxes obtained after the translation of coordinated overlap each other by an amount greater than a percentage threshold of their areas.

* * * * *